United States Patent
Sabetti

(10) Patent No.: US 9,527,348 B2
(45) Date of Patent: Dec. 27, 2016

(54) LOW-WEAR TYRE TREAD BAND

(71) Applicant: BRIDGESTONE CORPORATION, Chuo-ku, Tokyo (JP)

(72) Inventor: Emiliano Sabetti, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 188 days.

(21) Appl. No.: 14/372,406

(22) PCT Filed: Jan. 16, 2013

(86) PCT No.: PCT/IB2013/050403
§ 371 (c)(1),
(2) Date: Jul. 15, 2014

(87) PCT Pub. No.: WO2013/108195
PCT Pub. Date: Jul. 25, 2013

(65) Prior Publication Data
US 2014/0352861 A1     Dec. 4, 2014

(30) Foreign Application Priority Data

Jan. 16, 2012   (IT) ............... TO2012A0026

(51) Int. Cl.
*B60C 11/00* (2006.01)
*B60C 11/01* (2006.01)
*B60C 11/03* (2006.01)

(52) U.S. Cl.
CPC ........ *B60C 11/0083* (2013.04); *B60C 11/0304* (2013.04); *B60C 11/0332* (2013.04); *B60C 2011/013* (2013.04)

(58) Field of Classification Search
CPC ................. B60C 11/0083; B60C 11/01; B60C 2011/013; B60C 11/0304; B60C 3/02; B60C 3/04; B60C 11/0327; B60C 11/0332; B60C 11/03
(Continued)

(56) References Cited

U.S. PATENT DOCUMENTS

| 4,262,721 A | * | 4/1981 | Tadokoro | ............ B60C 11/0083 152/209.14 |
| 5,769,978 A | * | 6/1998 | Lurois | ...................... B60C 9/20 152/209.16 |

(Continued)

FOREIGN PATENT DOCUMENTS

EP   0 878 329 A1   11/1998
JP   11-165504 A    6/1999
(Continued)

OTHER PUBLICATIONS

International Search Report for PCT/IB2013/050403 dated Jun. 28, 2013 (PCT/ISA/210).

*Primary Examiner* — Eric Hug
(74) *Attorney, Agent, or Firm* — Sughrue Mion, PLLC

(57) ABSTRACT

A tire tread band having a center, two shoulders on either side of the center, and two edges on either side of the shoulders and forming a transition with the sidewalls. The profile of the tread band has at least a first arc forming part of the center, two second arcs forming part of the shoulders, and two third arcs forming part of the edges; and, at one junction, each second arc is connected discontinuously to the first arc by a step, wherein the second arc is not tangent to, and is radially lower than, the first arc.

14 Claims, 6 Drawing Sheets

(58) Field of Classification Search
USPC ............... 152/209.14, 209.15, 209.16, 209.8
See application file for complete search history.

(56) References Cited

U.S. PATENT DOCUMENTS

| | | | | |
|---|---|---|---|---|
| 6,079,463 | A * | 6/2000 | Minami | ............... B60C 3/04 152/209.14 |
| 7,275,573 | B2 * | 10/2007 | Nguyen | ............... B60C 9/28 152/209.14 |
| 2005/0061410 | A1 * | 3/2005 | Meyer | ............... B60C 11/00 152/209.14 |
| 2012/0103488 | A1 * | 5/2012 | Kubota | ............... B60C 11/0083 152/209.14 |

FOREIGN PATENT DOCUMENTS

| | | |
|---|---|---|
| JP | 2010-42711 A | 2/2010 |
| WO | 00/56559 A1 | 9/2000 |

\* cited by examiner

LOW-WEAR TYRE TREAD BAND

CROSS REFERENCE TO RELATED APPLICATIONS

This application is a National Stage of International Application No. PCT/IB2013/050403 filed Jan. 16, 2013, claiming priority based on Italian Patent Application No. TO2012A000026 filed Jan. 16, 2012, the contents of all of which are incorporated herein by reference in their entirety.

TECHNICAL FIELD

The present invention relates to a tyre tread band.

BACKGROUND ART

One known way of improving tyre tread wear (i.e. to increase the rolling wear resistance of the tread and therefore the working life of the tyre) is to use special rubber compounds for the tread. Low-wear tread compounds, however, have the drawback of poor wet-road-holding performance (in other words, the improvement in wear achieved by altering the compound from which the tread is made is normally counterbalanced by a reduction in wet-road-holding performance).

Another known way of improving tyre tread wear is to reduce the voids in favour of solids in the tread pattern, to increase the rubber-on-pavement contact area of the footprint (and so reduce the specific pressure, and therefore mechanical stress, on the tread for a given vertical load on the tyre). This solution, however, further reduces wet-road-holding performance by impairing water purging from the footprint.

Another known way of improving tyre tread wear is to increase the footprint area (and so reduce the specific pressure, and therefore mechanical stress, on the tread for a given vertical load on the tyre). This solution, however, has the drawback of both reducing wet-road-holding performance and increasing rolling noise (i.e. the tyre is noisier).

A trade-off between the demands of wear resistance, wet-road-holding performance and rolling noise is therefore unavoidable, with the result that all three are good, but none is exceptional.

Patent Application EP878329A1 describes a tyre tread band comprising a centre; two shoulders on either side of the centre; and two edges on either side of the shoulders and forming a transition with the sidewalls.

In a first embodiment shown in FIG. 4B of Patent Application EP878329A1, the tread band profile comprises a first arc having a first radius R'; and two second arcs located outwards of the first arc and having a second radius Rs' smaller than the first radius R'. At a junction, each second arc is connected continuously (i.e. with no discontinuity) to the first arc; and the radial distance To', Tt' between the extension of the first arc and the second arc increases gradually from the centre towards the shoulders.

In a second embodiment shown in FIG. 4C of Patent Application EP878329A1, the tread band profile comprises a first arc having a radius R'; and two second arcs located outwards of the first arc and having the same radius R'. At a junction, each second arc is connected discontinuously to the first arc, forming a step, wherein the second arc is not tangent to, and is radially lower than, the first arc; and the radial distance To', Tt' between the extension of the first arc and the second arc is constant from the centre towards the shoulders.

DESCRIPTION OF THE INVENTION

It is an object of the present invention to provide a tyre tread band designed to eliminate the above drawbacks, and which, in particular, is cheap and easy to produce, and at the same time provides for superior wear resistance and wet-road-holding performance, and low rolling noise.

According to the present invention, there is provided a tyre tread band as claimed in the accompanying Claims.

BRIEF DESCRIPTION OF THE DRAWINGS

A non-limiting embodiment of the present invention will be described by way of example with reference to the attached drawings, in which.

PREFERRED EMBODIMENTS OF THE INVENTION

Figure 1:
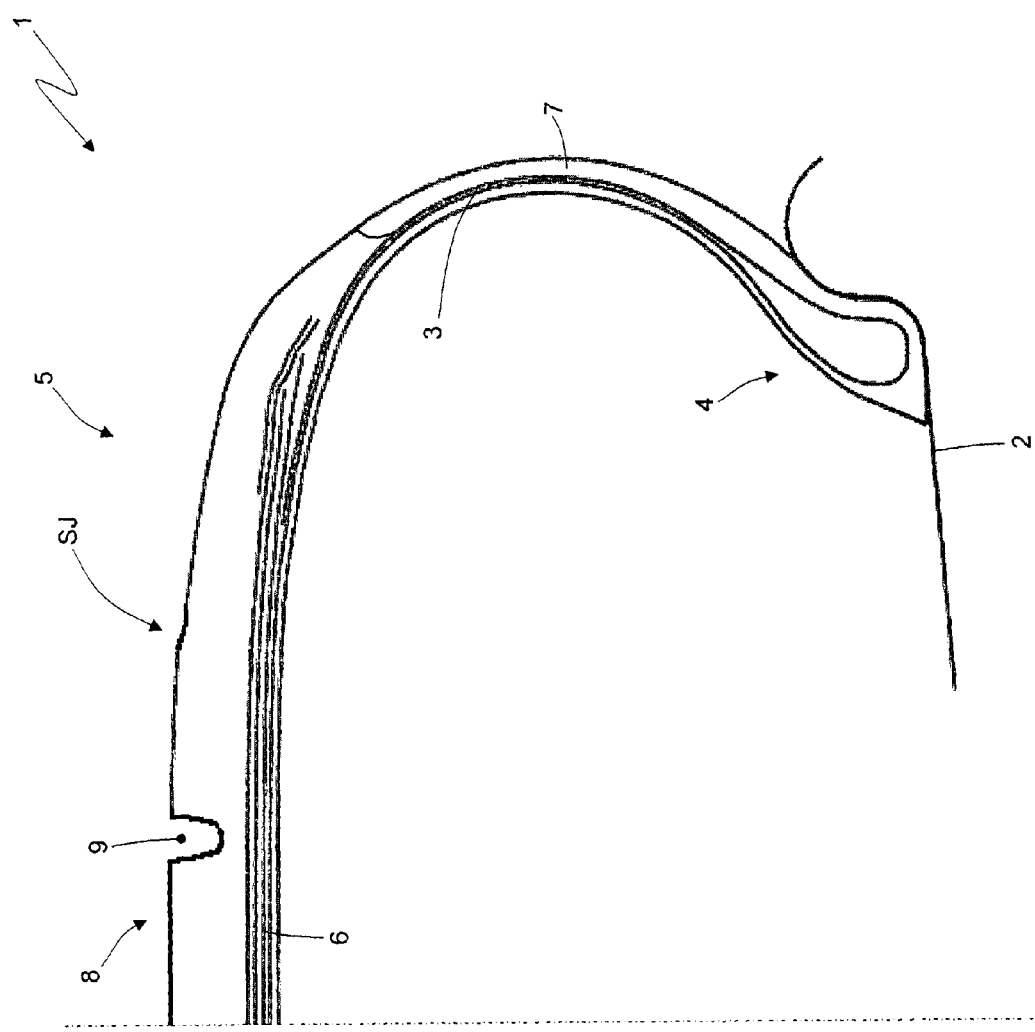
FIG. 1 shows a schematic cross section of part of a tyre with a tread band in accordance with the present invention.

Number 1 in FIG. 1 indicates as a whole a tyre mounted on a rim 2 (shown partly and schematically). Tyre 1 comprises a toroidal body ply 3 having two beads 4 and supporting a tread band 5 made of cured-rubber-based material. A tread belt 6 is interposed between body ply 3 and tread band 5. And body ply 3 supports two sidewalls 7 between tread band 5 and beads 4.

Tread band 5 has a rolling surface 8, which externally defines tread band 5 (i.e. is located radially outwards) and, in use, rests on the road surface. Rolling surface 8 of tread band 5 is interrupted by a raised pattern bounded by a number of longitudinal or transverse grooves 9, which define a number of blocks projecting radially from tread band 5.

Figure 2:
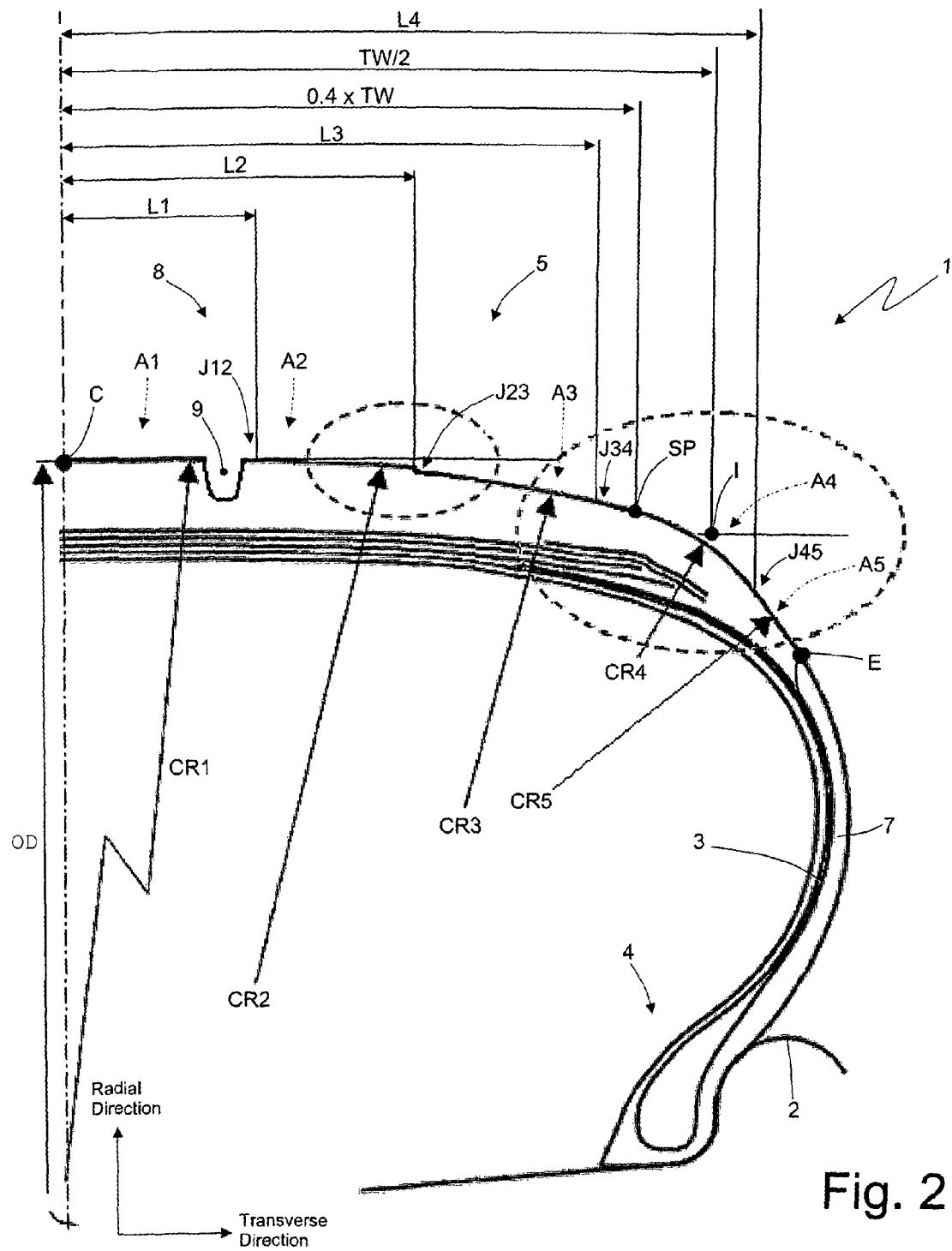
FIG. 2 shows a number of salient dimensions of the FIG. 1 cross section.

As shown in FIG. 2, tread band 5 extends between two opposite lateral ends E (only one shown in FIG. 2) located at the borders between tread band 5 and sidewalls 7. Dividing tread band 5 into two symmetrical halves, each half (as shown in FIG. 2) extends between a centre point C, located at the longitudinal (circumferential) plane of symmetry, and a lateral end E. The profile of each half of tread band 5 (as shown in FIG. 2) comprises five successive arcs A1-A5 with respective radii CR1-CR5 (which decrease gradually from the centre to the periphery).

Arc A1 has a radius CR1, has a centre along the longitudinal (circumferential) plane of symmetry, is located at the centreline of tread band 5, and extends (in each half of tread band 5) to a length L1. Arc A2 is located alongside arc A1, is connected to arc A1 at a junction J12, has a radius CR2 smaller than radius CR1 of arc A1, and extends to a length L2-L1. Arc A3 is located alongside arc A2, is connected to arc A2 at a junction J23, has a radius CR3 smaller than radius CR2 of arc A2, and extends to a length L3-L2. Arc A4 is located alongside arc A3, is connected to arc A3 at a junction J34, has a radius CR4 smaller than radius CR3 of arc A3, and extends to a length L4-L3. And arc A5 is located alongside arc A4, is connected to arc A4 at a junction J45, has a radius CR5 smaller than radius CR4 of arc A4, and extends to a length L5-L4.

In a preferred embodiment, length L1 of arc A1 (in each half of tread band 5) is greater than the length (L2−L1) of arc A2. That is:

$$L1>(L2-L1)$$

Arcs A1 and A2 form part of the centre of tread band 5; arc A3 forms part of the shoulder of tread band 5; and arcs A4 and A5 form part of the edge of tread band 5, which does not normally come into contact with the road surface as tyre 1 rolls, and which forms a transition between tread band 5 and the corresponding sidewall 7. In a different embodiment not shown, arc A2 is eliminated, and arc A1 is connected directly to arc A3 (i.e. arcs A1 and A2 coincide). In a further embodiment not shown, arc A5 is eliminated, and arc A4 is connected directly to sidewall 7 (i.e. arcs A4 and A5 coincide).

Figure 4:
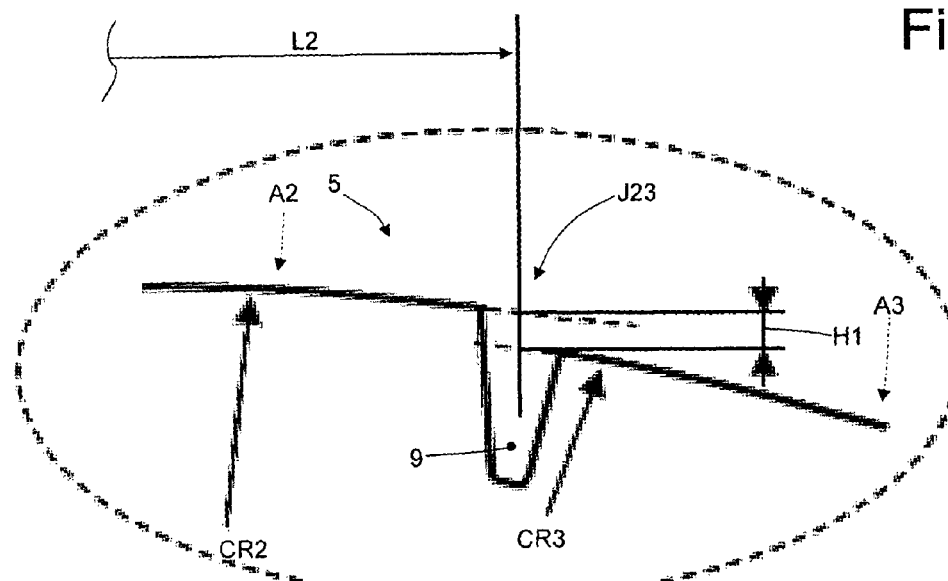
FIG. 4 shows an alternative embodiment of the first part in FIG. 3.
Figure 3:
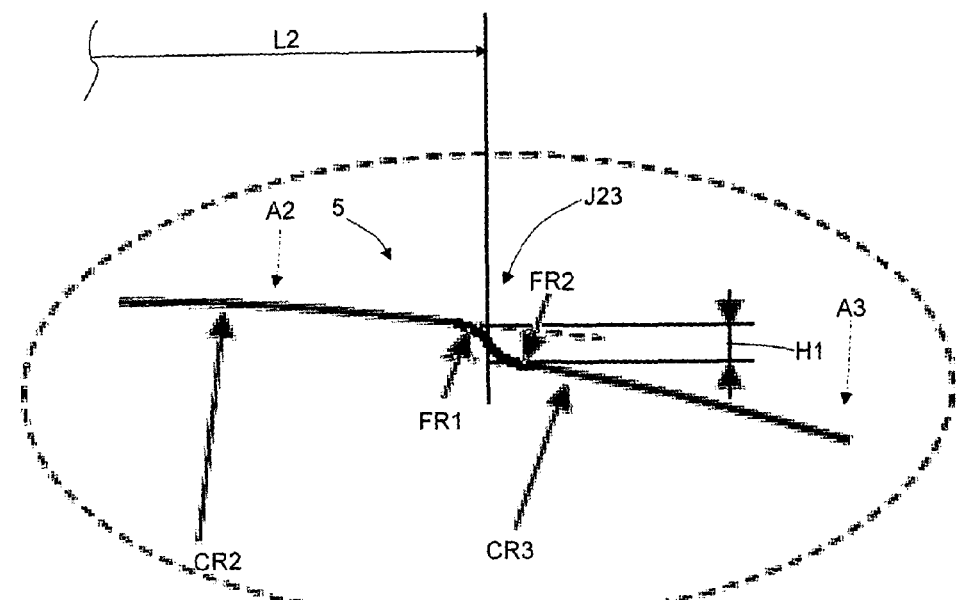
FIG. 3 shows a larger-scale view of a first part of FIG. 2.

At junction J12, arc A2 is tangent to arc A1, so as to connect arcs A1 and A2 continuously. At junction J34, arc A4 is tangent to arc A3, so as to connect arcs A3 and A4 continuously. At junction J45, arc A5 is tangent to arc A4, so as to connect arcs A4 and A5 continuously. But, at junction J23, arc A3 is not tangent to arc A2, and is radially lower than arc A2, so as to connect arcs A2 and A3 discontinuously by a step. In the FIG. 4 embodiment, junction J23 is located at a longitudinal groove 9, which means there is no 'connection' between arcs A2 and A3. In the FIG. 3 embodiment, on the other hand, arcs A2 and A3 are 'connected' at junction J23 by an S-shaped fillet, i.e. having two oppositely-concave curves (one concave and one convex) with respective radii FR1 and FR2.

At junction J23 (i.e. at the discontinuity step), the height H1 of the step (i.e. the radial distance between the end of arc A2 and the end of arc A3, i.e. the radial distance between arcs A2 and A3) ranges between 0.05% and 0.15% of the total diameter OD of tyre 1, i.e.

$$(0.0005*OD)<H1<(0.0015*OD)$$

With a total diameter OD of tyre 1 of roughly 600 mm, the height H1 of the discontinuity step may be roughly 0.3 to 1.2 mm.

Using the reference tread width TW (defined in detail below) as a reference, the ratio between length L2 between the longitudinal (circumferential) plane of symmetry and junction J23 and the reference tread width TW ranges between 0.2 and 0.35, i.e.

$$0.2<(L2/TW)<0.35$$

Preferably, the ratio between length L2 between the longitudinal (circumferential) plane of symmetry and junction J23 and the reference tread width TW ranges between 0.25 and 0.3, i.e.

$$0.25<(L2/TW)<0.3$$

Figure 7:
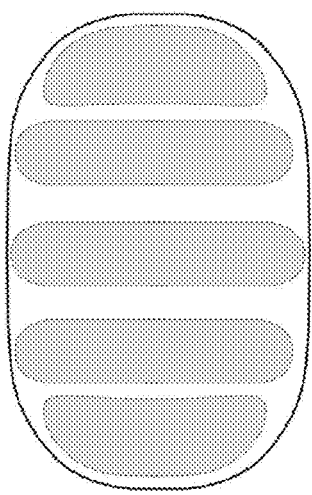
FIGS. 7 to 9 show schematic footprints of different types of known tyres.
Figure 8:
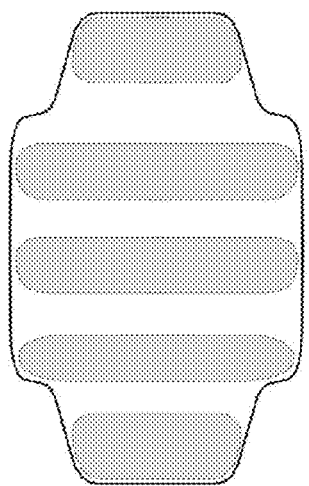
Figure 9:
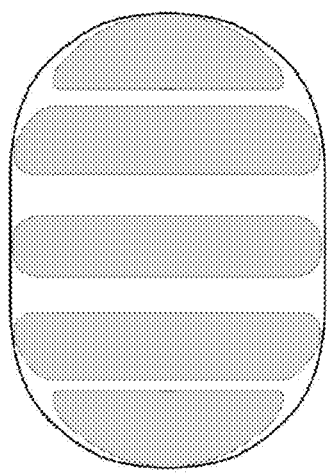
Figure 10:
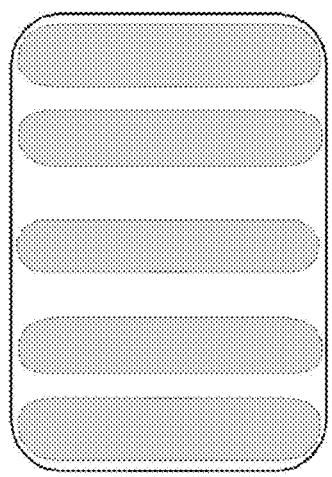
FIG. 10 shows a schematic of the FIG. 1 tyre footprint.

The above relationship between length L2 between the longitudinal (circumferential) plane of symmetry and junction J23 and the reference tread width TW produces a tread band 5 footprint 'shape' which provides for excellent wear resistance and wet-road-holding performance, and low noise. In fact, without the step at junction J23, the tread band 5 footprint is of 'regular' shape, as shown in FIGS. 7 to 9 (i.e. varies from an ellipse with a smaller contact area, as shown in FIG. 7, to a rectangle with a larger contact area, as shown in FIG. 9); whereas, with the step at junction J23, the tread band 5 footprint is 'irregular' in shape (as shown in FIG. 10) with a larger central area and two smaller lateral areas ('ears'). A rectangular footprint of tread band 5 (as shown in FIG. 9) has excellent wear resistance, but impairs wet-road-holding performance and increases noise; an elliptical footprint of tread band 5 (as shown in FIG. 7) provides for excellent wet-road-holding performance and low noise, but impairs wear resistance; an intermediate footprint of tread band 5 (as shown in FIG. 8) is a classic trade-off, which attempts to balance wear resistance with wet-road-holding performance and low noise, but excels in none of them; whereas, an 'irregular' footprint of tread band 5 (as shown in FIG. 10), which is only achievable in accordance with the present invention, achieves only the advantages, and none of the drawbacks, of the others, i.e. excellent wear resistance and wet-road-holding performance, and low noise.

The key to achieving the 'irregular' footprint shape of tread band 5 (with a larger central area and two smaller lateral areas or 'ears', as shown in FIG. 10) is the discontinuity at junction J23, i.e. the step, at junction J23, between the (radially higher) end of arc A2 and the (radially lower) end of arc A3. To achieve all the possible advantages, however, other factors also govern the shape of the tread band 5 profile at junction J23.

Varying the position of discontinuous junction J23 (i.e. varying the length L2 between the longitudinal plane of symmetry and junction J23) alters the ratio between the larger central area and the two smaller lateral areas or 'ears' of the footprint. The relationship described above between length L2 between the longitudinal (circumferential) plane of symmetry and junction J23 and reference tread width TW therefore ensures an optimum 'shape' of the tread band 5 footprint. In this connection, it is important to note that the total width of the tread band 5 footprint ranges between 80% and 90% of reference tread width TW.

Figure 5:
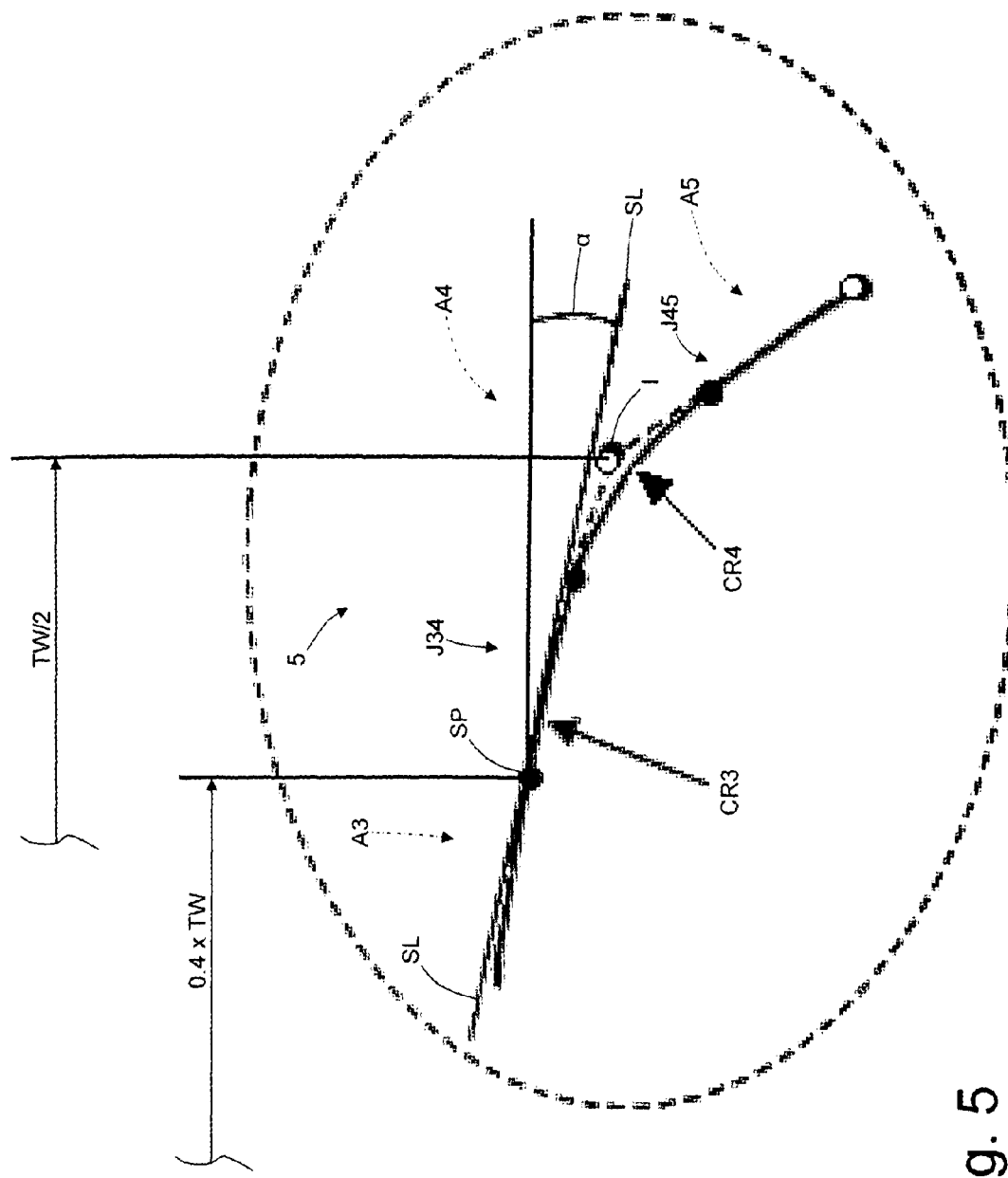
FIG. 5 shows a larger-scale view of a second part of FIG. 2.

As shown in FIGS. 2 and 5, reference tread width TW is the distance between the two points of intersection I (only one shown in FIGS. 2 and 5) on either side of tread band 5; and, on each side of tread band 5, the point of intersection I is the point at which the extensions of arcs A3 and A5 intersect (i.e. the point at which the outward extension of arc A3 intersects the inward extension of arc A5).

Figure 6:
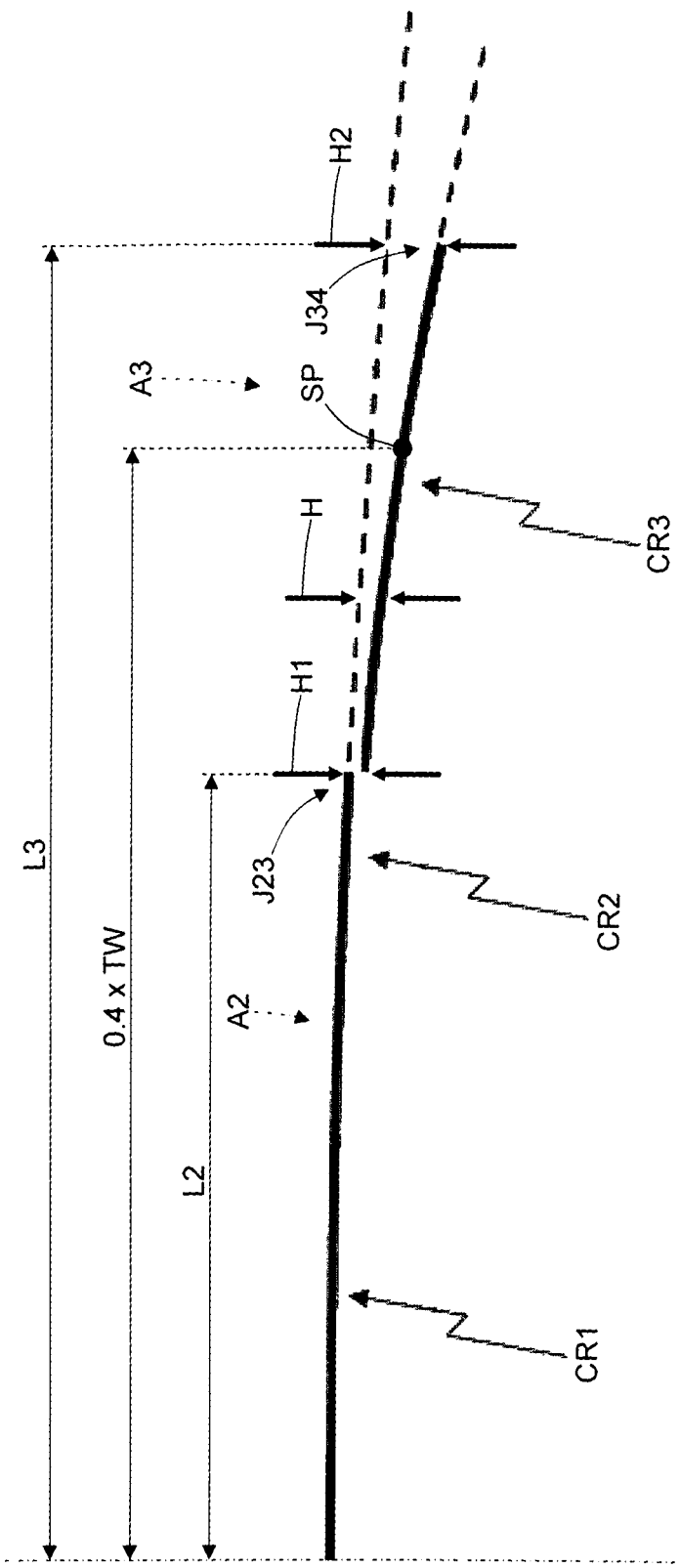
FIG. 6 shows a larger-scale view of a third part of FIG. 2.

With reference to FIG. 6, to achieve the advantages of the present invention, the radial distance H between the extension of arc A2 and arc A3 must increase gradually from the centre towards the shoulders. Consequently, the radial distance H1 between the extension of arc A2 and arc A3 (i.e. the height H1 of the step) at junction J23 must be less than the radial distance H2 between the extension of arc A2 and arc A3 at junction J34.

Discontinuous junction J23 makes for a much shorter contact length of the shoulders than of the centre of tread band 5, which benefits both wet-road-holding performance (by greatly increasing maximum hydroplaning speed and so improving water purge from the centre towards the shoulders) and rolling noise (due to the different impact-release times of the shoulder blocks with respect to the centre blocks of tread band 5). At the same time, junction J23 enables use of arcs A1-A3 with very long radii CR1-CR3, which enables tread band 5 to flatten easily on the road surface as the tyre rolls, thus distributing contact evenly over the whole of tread band 5. As such, the differences in the rolling radius along tread band 5 are negligible, thus minimizing longitudinal slide, which produces greater local wear.

By way of example, the FIG. 7 footprint has a roughly 70% FR ratio (i.e. the ratio between the contact length of the shoulders and the contact length of the centre of tread band 5); the FIG. 8 footprint has a roughly 80% FR ratio; and the FIG. 9 footprint has a roughly 99% FR ratio. The FIG. 10 footprint, on the other hand, has a roughly 65% FR ratio, which provides for achieving the same wet-road-holding performance and noise level as the FIG. 7 footprint, but also a wear resistance better than that of the FIG. 8 footprint and almost the same as (only slightly less than) that of the FIG. 9 footprint.

It is important to note that even small step heights H1 (as shown so far) at junction J23 are sufficient to achieve 60-70% FR ratios. Smaller FR ratios could be obtained by increasing height H1, but are not recommended, on the grounds that they provide for no significant improvement in wet-road-holding performance or noise level, while at the same time greatly impairing wear resistance.

In a preferred embodiment, arc A1 has a very large radius CR1 (more specifically, radius CR1 of arc A1 may even be infinite, in which case, arc A1 degenerates into a segment). In one option, radius CR1 of arc A1 is over 600-1500 mm (600 mm for small tyres, and 1500 mm for large tyres). In a second option, radius CR1 of arc A1 is over twice the total diameter OD of tyre 1. The centre of tread band 5 is therefore substantially flat, which enables tread band 5 to flatten easily on the road surface as the tyre rolls, thus distributing contact evenly over the whole of tread band 5. Another advantage lies in the contact length at the centre of tread band 5 also being distributed evenly. As such, the differences in the rolling radius along the centre of tread band 5 are negligible, thus minimizing longitudinal slide, which produces greater local wear.

Radius CR3 of arc A3 of each shoulder of tread band 5 is smaller than radii CR1 and CR2 of arcs A1 and A2 of the centre of tread band 5, and must be long enough to reduce deformation and longitudinal slide of the shoulder of tread band 5 contacting the road surface. Unlike radii CR1 and CR2 of arcs A1 and A2 of the centre of tread band 5, however, radius CR3 of arc A3 of each shoulder of tread band 5 must not be too long to connect with radius CR4 of arc A4 of the edge of tread band 5, which is relatively small to connect to sidewalls 7. Too great a difference between radius CR3 of arc A3 and radius CR4 of arc A4 would result in a concentration of stresses, and therefore severe wear, at the edge of tread band 5. There is also another reason for limiting the length of radius CR3 of arc A3: as the shoulders of tread band 5 contact the road surface, concave deformation changes their curvature from convex to flat; so, if the undeformed shoulders of tread band 5 were to be already flat (or almost) due to very long radii CR3, concave deformation would cause the shoulders of tread band 5 to assume a concave shape, thus resulting in concentrated stresses and wear on both the inner and outer side of each shoulder.

To sum up, radius CR3 of arc A3 must preferably range between 80 mm (for small tyres) and 400 mm (for larger tyres); and radius CR4 of arc A4 normally ranges between roughly 20 mm and 35 mm.

Making radius CR3 of arc A3 smaller than radius CR2 of arc A2, which in turn is smaller than radius CR1 of arc A1, and combining an over 1000 mm radius CR1 of arc A1 with a 200-400 mm radius CR3 of arc A3, make it easier to achieve the condition in which the radial distance H between the extension of arc A2 and arc A3 increases gradually from the centre towards the shoulders, i.e. in which the radial distance H1 between the extension of arc A2 and arc A3 (i.e. the height H1 of the step) at junction J23 is less than the radial distance H2 between the extension of arc A2 and arc A3 at junction J34.

An important parameter for determining the shape of tread band 5 is the shoulder slope angle $\alpha$ (shown in FIG. 5), which is the angle between the tangent SL to arc A3 at the characteristic point SP, and the horizontal. The characteristic point SP, at which the tangent SL to arc A3 is determined, is the point along arc A3 separated from the longitudinal (circumferential) plane of symmetry by a distance equal to 40% of reference tread width TW. The shoulder slope angle $\alpha$ must not be too small (close to zero), to avoid impairing water purge (with small shoulder slope angles $\alpha$, water accumulates in the shoulders, impairing wet-road-holding performance), and to avoid increasing wear on the outer edges of the shoulders. On the other hand, too large a shoulder slope angle $\alpha$, while slightly improving noise level and wet-road-holding performance, also increases wear on the outer edges of the shoulders. The shoulder slope angle $\alpha$ preferably ranges between 5° and 20°, and more preferably between 8° and 12°, which makes it easier to achieve the condition in which the radial distance H between the extension of arc A2 and arc A3 increases gradually from the centre towards the shoulders, i.e. in which the radial distance H1 between the extension of arc A2 and arc A3 (i.e. the height H1 of the step) at junction J23 is less than the radial distance H2 between the extension of arc A2 and arc A3 at junction J34.

Discontinuous step junction J23 also has the further advantage of further improving wear resistance. When tyre 1 is pressed against the road surface, the vertical load is transmitted mostly by the pressurized air inside tyre 1, and to a lesser degree by the structure of tyre 1. When a known tyre 1 flattens on the road surface, the shoulders of tread band 5, as they 'roll' on their curved profile, tend to lift up the centre of tread band 5, thus reducing pressure in the centre and increasing pressure (and hence wear) on the shoulders. With a discontinuous step junction J23, a counterbalancing moment from the shoulders to the centre is generated, and which tends to push the centre of tread band 5 onto the road surface, thus preventing a reduction in pressure in the centre and an increase in pressure (and hence wear) on the shoulders.

In the embodiment described above, tread band 5 is symmetrical (i.e. specular with respect to the longitudinal plane of symmetry of tyre 1). Alternatively, tread band 5 may be asymmetrical (i.e. not specular with respect to the longitudinal plane of symmetry of tyre 1).

Tread band 5 described has numerous advantages.

Firstly, it is cheap and easy to produce, and can be made using a conventional mold, by simply altering the tread pattern.

Secondly, it provides for simultaneously improving wear resistance, wet-road-holding performance and rolling noise.

The invention claimed is:
1. A tread band for a tyre;
the tyre comprises a toroidal body ply which has two beads and supports the tread band and two sidewalls each arranged between the tread band and a respective bead;
the tread band extends between two opposite lateral ends located at borders between the tread band and the sidewalls;
the tread band comprises a centre extending between two first junctions; two shoulders, which are located on either side of the centre and each of which extends between a respective first junction and a second junction; and two edges, which are located on either side of the shoulders, belong to the tread band, form a transi- tion with the sidewalls, and each of which extends between a respective second junction and a lateral end;

the profile of the tread band comprises at least a first arc forming part of the centre of the tread band and having a first radius; two second arcs forming part of the shoulders of the tread band and having a second radius smaller than the first radius; and two third arcs forming part of the edges of the tread band and having a third radius smaller than the second radius;

the profile of the tread band also comprises a fourth arc, which has a fourth radius greater than the first radius of the first arc, forms part of the centre of the tread band, is located centrally between two first arcs, and extends between two third junctions;

at each first junction, each second arc is connected discontinuously to the first arc by a step, wherein the second arc is not tangent to, and is radially lower than, the first arc;

at each second junction, each third arc is tangent, and connected continuously, to the second arc;

at each third junction, each first arc is tangent and connected continuously to the fourth arc; and the radial distance between the extension of the first arc and the second arc increases gradually from the centre to the shoulders, so that the radial distance, measured at the first junction, between the extension of the first arc and the second arc is less than the radial distance, measured at the second junctions, between the extension of the first arc and the second arc.

2. A tread band as claimed in claim 1, wherein the fourth radius of the fourth arc is over 600 mm.

3. A tread band as claimed in claim 1, wherein the fourth radius of the fourth arc is over twice the total diameter of the tyre.

4. A tread band as claimed in claim 1, wherein the length of the fourth arc in one half of the tread band is greater than the length of the first arc.

5. A tread band as claimed in claim 1, wherein the second radius of the second arc ranges between 80 mm and 400 mm.

6. A tread band as claimed in claim 1, wherein:
the profile of the tread band also comprises two fifth arcs, which have a fifth radius smaller than the first radius, form part of the edges of the tread band, and are located on either side of the third arcs; and
at a fourth junction, each third arc is tangent, and connected continuously, to the fifth arc.

7. A tread band as claimed in claim 1, wherein the first junction is located at a longitudinal groove, so there is no connection between the first arc and the second arc.

8. A tread band as claimed in claim 1, wherein, at the first junction, the first arc is connected to the second arc by an S-shaped fillet.

9. A tread band as claimed in claim 1, wherein, at the first junction, the height
of the discontinuity step ranges between 0.05% and 0.15% of the total diameter of the tyre.

10. A tread band as claimed in claim 1, wherein:
on each side of the tread band, the point of intersection is the point at which the outward extension of the second arc intersects the inward extension of a fifth arc;
the reference tread width is the distance between the two points of intersection on either side of the tread band;
a first length exists between the longitudinal plane of symmetry of the tyre and the first junction; and
the ratio between the first length and the reference tread width ranges between 0.2 and 0.35.

11. A tread band as claimed in claim 1, wherein:
on each side of the tread band, the point of intersection is the point at which the outward extension of the second arc intersects the inward extension of a fifth arc;
the reference tread width is the distance between the two points of intersection on either side of the tread band;
the characteristic point of each second arc is the point, along the second arc, separated from the longitudinal plane of symmetry by a distance equal to 40% of the reference tread width;
the slope angle of the shoulders is the angle between the tangent to the second arc at the characteristic point, and the horizontal; and
the slope angle of the shoulders ranges between 5° and 20°.

12. A tread band as claimed in claim 1, wherein the tread band is asymmetrical with respect to a longitudinal plane of symmetry of the tyre.

13. A tread band for a tyre;
the tread band comprises a centre; two shoulders on either side of the centre; and two edges on either side of the shoulders and forming a transition with the sidewalls;
the profile of the tread band comprises at least a first arc forming part of the centre of the tread band and having a first radius; two second arcs forming part of the shoulders of the tread band and having a second radius; and two third arcs forming part of the edges of the tread band and having a third radius;
at a first junction, each second arc is connected discontinuously to the first arc by a step, wherein the second arc is not tangent to, and is radially lower than, the first arc;
at a second junction, each third arc is tangent, and connected continuously, to the second arc;
the radial distance between the extension of the first arc and the second arc increases gradually from the centre to the shoulders, so that the radial distance, measured at the first junction, between the extension of the first arc and the second arc is less than the radial distance, measured at the second junctions, between the extension of the first arc and the second arc;
on each side of the tread band, the point of intersection is the point at which the outward extension of the second arc intersects the inward extension of a fourth arc;
the reference tread width is the distance between the two points of intersection on either side of the tread band;
the characteristic point of each second arc is the point, along the second arc, separated from the longitudinal plane of symmetry by a distance equal to 40% of the reference tread width;
the slope angle of the shoulders is the angle between the tangent to the second arc at the characteristic point, and the horizontal; and
the slope angle of the shoulders ranges between 5° and 20°.

14. A tread band as claimed in claim 13, wherein the slope angle of the shoulders ranges between 8° and 12°.

* * * * *